United States Patent
Qi et al.

(10) Patent No.: US 11,423,227 B2
(45) Date of Patent: Aug. 23, 2022

(54) WEAK SUPERVISED ABNORMAL ENTITY DETECTION

(71) Applicant: International Business Machines Corporation, Armonk, NY (US)

(72) Inventors: Haode Qi, Cambridge, MA (US); Ming Tan, Malden, MA (US); Yang Yu, Acton, MA (US); Navneet N. Rao, Arlington, MA (US); Ladislav Kunc, Cambridge, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 16/789,804

(22) Filed: Feb. 13, 2020

(65) Prior Publication Data

US 2021/0256211 A1  Aug. 19, 2021

(51) Int. Cl.
*G06F 40/295* (2020.01)
*G06F 16/23* (2019.01)
(Continued)

(52) U.S. Cl.
CPC ........ *G06F 40/295* (2020.01); *G06F 16/2365* (2019.01); *G06F 40/30* (2020.01);
(Continued)

(58) Field of Classification Search
None
See application file for complete search history.

(56) References Cited

U.S. PATENT DOCUMENTS

| 8,949,377 B2 | 2/2015 | Makar et al. |
| 10,191,999 B2 * | 1/2019 | Liu .......... G06F 40/30 |

(Continued)

FOREIGN PATENT DOCUMENTS

| CN | 107193978 A | 9/2017 |
| CN | 109325106 A | 2/2019 |
| KR | 1019711582 B1 | 8/2019 |

OTHER PUBLICATIONS

Anonymously, "Continuous improved conversation entities", IP.com No. IPCOM000254529D, IP.com Electronic Publication Date: Jul. 10, 2018, 4 pages.

(Continued)

*Primary Examiner* — Antim G Shah
(74) *Attorney, Agent, or Firm* — Stephen J. Walder, Jr.; Brian Welle

(57) ABSTRACT

A mechanism is provided to implement an abnormal entity detection mechanism that facilitates detecting abnormal entities in real-time response systems through weak supervision. For each first intent from an entity labeled workspace that matches a second intent in labeled chat logs, when the entity score associated with each first entity or second entity is above a predefined significance level the first entity or the second entity is recorded. For each first intent from the entity labeled workspace that matches the second intent in the labeled chat logs: responsive to the first entity being recorded and the second entity failing to be recorded, that first entity is removed from the training data as being mistakenly included; or, responsive to the second entity being recorded and the first entity failing to be recorded, that second entity is added as a potential business case to the training data.

20 Claims, 10 Drawing Sheets

(51) Int. Cl.
*H04L 51/02* (2022.01)
*G06Q 30/00* (2012.01)
*G06F 40/30* (2020.01)
*G06N 20/00* (2019.01)

(52) U.S. Cl.
CPC .......... *G06N 20/00* (2019.01); *G06Q 30/016* (2013.01); *H04L 51/02* (2013.01)

(56) References Cited

U.S. PATENT DOCUMENTS

| | | |
|---|---|---|
| 2014/0164296 A1 | 6/2014 | Duan et al. |
| 2019/0188590 A1 | 6/2019 | Wu et al. |
| 2019/0294673 A1* | 9/2019 | Sapugay ............... G06F 16/285 |
| 2020/0334228 A1* | 10/2020 | Matyska ................. G06N 20/00 |
| 2021/0056169 A1* | 2/2021 | Bahirwani ............ G06F 40/295 |

OTHER PUBLICATIONS

Anonymously,, "Generation of Similarity Scored Entities from a Known Set of Categorized Entities", IP.com No. IPCOM000256546D, IP.com Electronic Publication Date: Dec. 7, 2018, 3 pages.

Grishman, Ralph et al., "Message Understanding Conference—6: A Brief History", COLING '96: Proceedings of the 16th conference on Computational linguistics—vol. 1 Aug. 1996, 6 Pages.

Liu, Huan et al., "Chi2: Feature Selection and Discretization of Numeric Attributes", Proceedings of the IEEE 7th International Conference on Tools with Artificial Intelligence, Nov. 1995, 4 pages.

* cited by examiner

WEAK SUPERVISED ABNORMAL ENTITY DETECTION

BACKGROUND

The present application relates generally to an improved data processing apparatus and method and more specifically to mechanisms for utilizing weak supervision to detect abnormal entities in a real-time response system.

A real-time response system is a computer program that imitates human conversation—spoken, written, or both. Real-time response systems conduct conversations with people, and developers typically hope that users will not realize they're actually talking to a robot. Today, real-time response system are also known by many other names: chat bots, talkbot, bot, instant messaging (IM) bot, intelligent chatbot, conversation bot, AI conversation bot, talking bot, interactive agent, artificial conversation entity, or virtual talk chatbot.

Artificial intelligence (in the form of natural-language processing, machine learning, and deep learning) makes it possible for real-time response systems to "learn" by discovering patterns in data. With training, these real-time response systems can then apply the pattern to similar problems or slightly different questions. This ability gives them the "intelligence" to perform tasks, solve problems, and manage information without human intervention.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, comprising at least one processor and at least one memory is provided, where the at least one memory comprises instructions that are executed by the at least one processor to implement an abnormal entity detection mechanism that facilitates detecting abnormal entities in real-time response systems through weak supervision. For each first intent of one or more first intents from an entity labeled workspace, the illustrative embodiment identifies one or more first entities associated with the first intent and an entity score associated with each first entity. For each second intent of one or more second intents from labeled chat logs, the illustrative embodiment identifies one or more second entities associated with the second intent and an entity score associated with each second entity. For each first intent from the entity labeled workspace that matches a second intent in the labeled chat logs, the illustrative embodiment records the first entity or the second entity in a results data structure when the entity score associated with each first entity or second entity is above a predefined significance level. For each first intent from the entity labeled workspace that matches the second intent in the labeled chat logs: responsive to the first entity being recorded in a results data structure and the second entity failing to be recorded in the results data structure, the illustrative embodiment removes that the first entity from the training data as being mistakenly included in the training data, or responsive to the second entity being recorded in the results data structure and the first entity failing to be recorded in the results data structure, the illustrative embodiment adds the second entity as a potential business case to the training data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
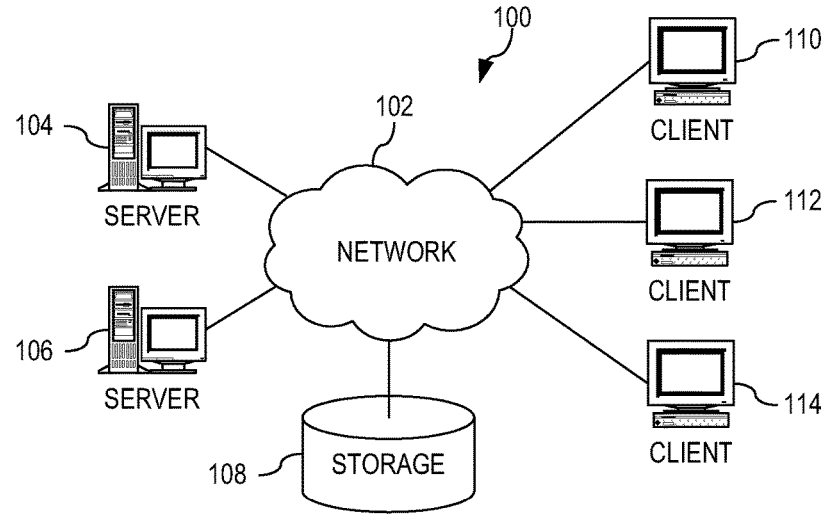
FIG. 1 is an example diagram of a distributed data processing system in which aspects of the illustrative embodiments may be implemented.

Again, real-time response systems are computer programs that imitates human conversation—spoken, written, or both. Artificial intelligence (in the form of natural-language processing, machine learning, and deep learning) makes it possible for real-time response systems to "learn" by discovering patterns in data. With training, these real-time response systems can then apply the pattern to similar problems or slightly different questions. This ability gives them the "intelligence" to perform tasks, solve problems, and manage information without human intervention. In training, modern real-time response systems utilize entity matching to detect fine-grained information through, for example, text classification. Therefore, proper definitions of entities positively improve results of the text classification. However, incorrect definitions of entities may potentially bias the text classification results and the behavior of entities may digress away from the real-time response system design during live performance.

Therefore, the illustrative embodiments provide an abnormal entity detection mechanism that tracks an interaction between intents and entities within an real-time response system. The abnormal entity detection mechanism maps a set of entities to a set of intents in training data using correlation analysis to generate an entity labeled workspace. The abnormal entity detection mechanism then maps a set of entities to a set of intents in a set of human conversation chat logs to generate a set of labeled chat logs. The abnormal entity detection mechanism then compares a distributional difference between entities and intents in training data, i.e. the entities in the entity labeled workspace, to a distributional difference between entities and intents in the set of labeled chat logs to identify entities that are potential business-use cases that should be added to the real-time response system for use in conversations with humans. As an additional feature, the abnormal entity detection mechanism may map a set of terms that are semantically similar to the identified entities in the entity labeled workspace to generate a semantic entity labeled workspace. The abnormal entity detection mechanism then compares a distributional difference between entities and intents in training data, i.e. the entities in the entity labeled workspace, to a distributional difference between entities and intents in the set of labeled chat logs to identify additional entities that are potential business-use cases that should be added to the real-time response system for use in conversations with humans and/or identify entities that may need to be redefined. In either comparison, the abnormal entity detection mechanism may remove outliers of intent/entity pairing by filtering out insignificant comparison values that are below a predetermined level.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
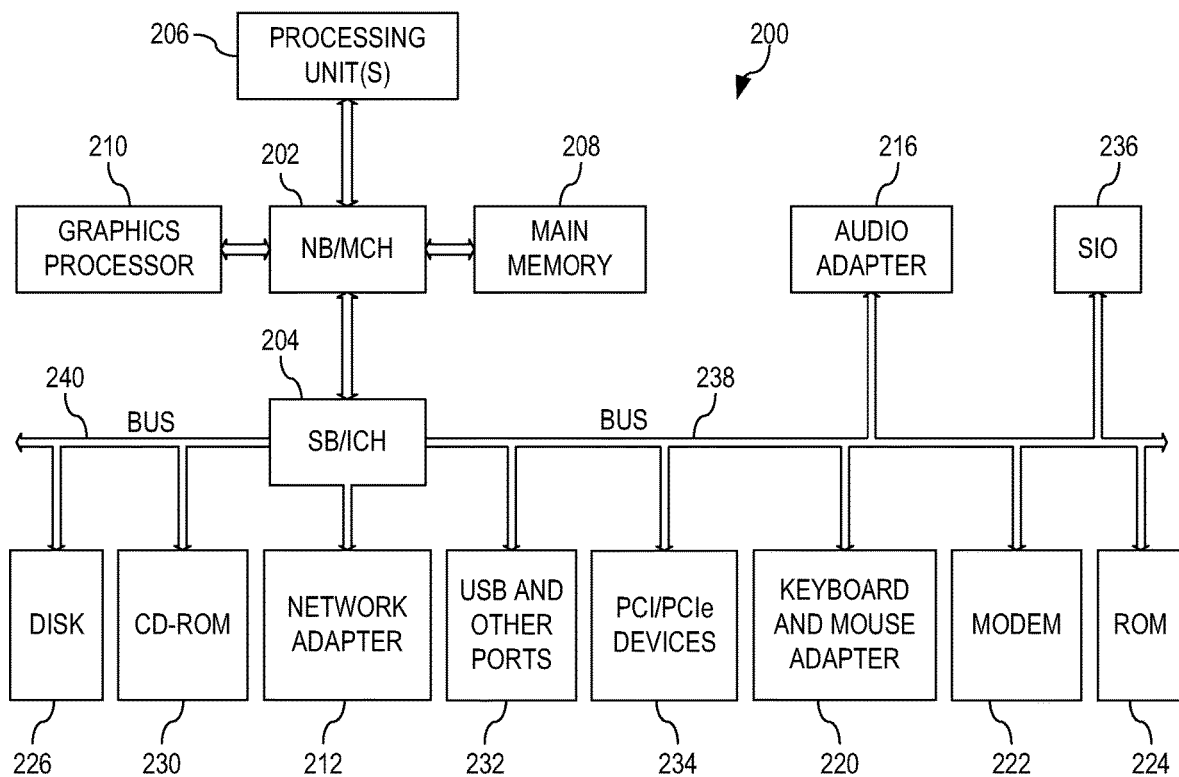
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an abnormal entity detection mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates utilizing weak supervision to detect abnormal entities in real-time response systems.

As noted above, the mechanisms of the illustrative embodiments utilize specifically configured computing devices, or data processing systems, to perform the operations for utilizing weak supervision to detect abnormal entities in real-time response systems. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the abnormal entity detection mechanism utilizing weak supervision to detect abnormal entities in real-time response systems.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
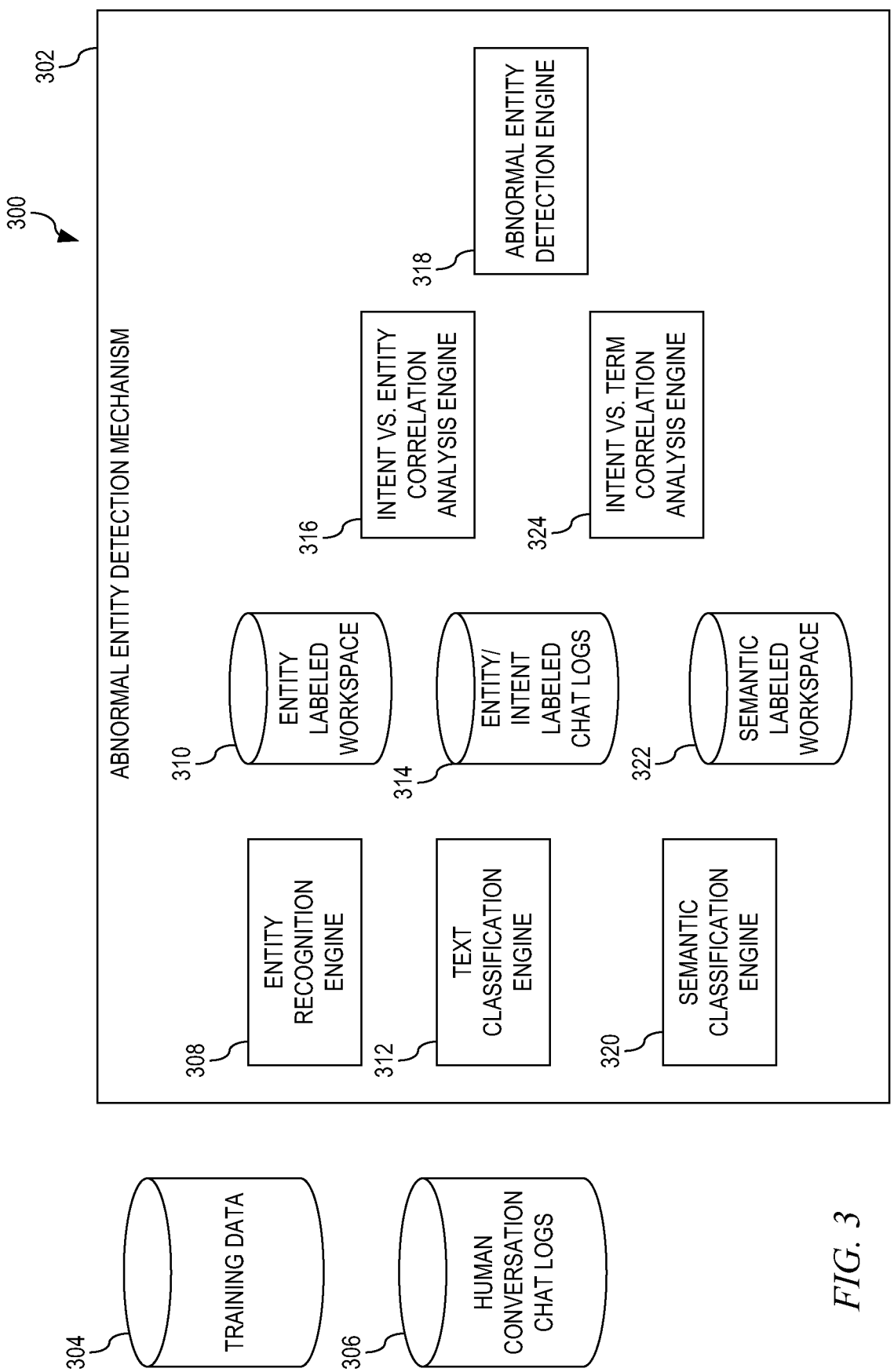
FIG. 3 depicts an exemplary functional block diagram of a data processing system in which an abnormal entity detection mechanism operates to detect abnormal entities in real-time response systems utilizing weak supervision in accordance with an illustrative embodiment.

FIG. 3 depicts an exemplary functional block diagram of a data processing system in which an abnormal entity detection mechanism operates to detect abnormal entities in real-time response systems utilizing weak supervision in accordance with an illustrative embodiment. Data processing system, which may be a data processing system such as data processing system 200 of FIG. 2, comprises abnormal entity detection mechanism 302 that utilizes training data 304 and human conversation chat logs 306. Training data 304 is data, in the form of sentences or phrases, that describes purposes or goals expressed in a customer's input. By recognizing the intent expressed in a customer's input, abnormal entity detection mechanism 302 chooses the correct dialog flow for responding. Therefore, abnormal entity detection mechanism 302 utilizes training data 304 to train a real-time response system. Human conversation chat logs 306 are logs of previous conversations held between the real-time response system and a human.

Figure 4:
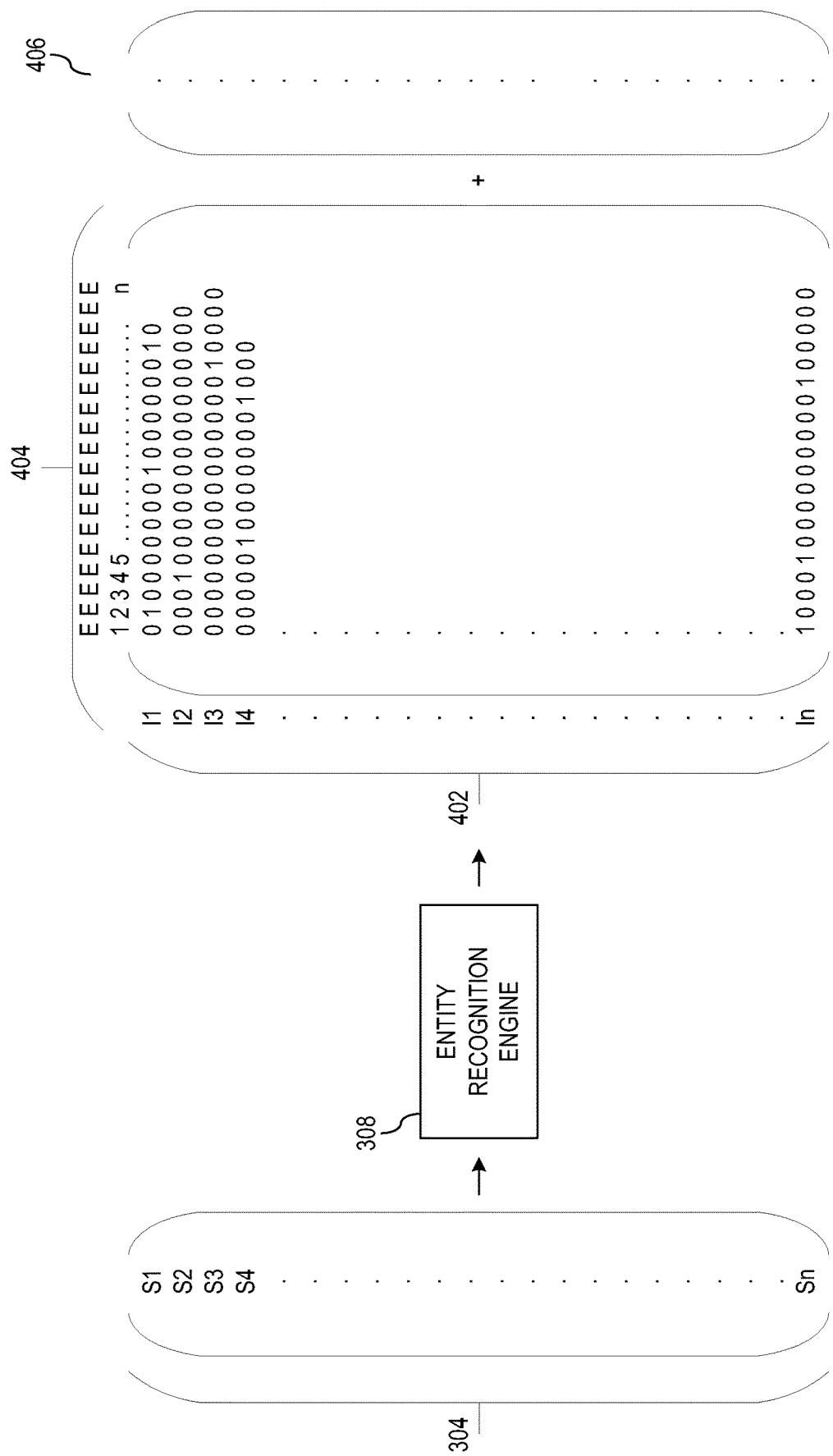
FIG. 4 illustrates one exemplary embodiment of an entity recognition engine identifying an intent of each sentence and one or more entities within each sentence in the set of sentences within training data in accordance with an illustrative embodiment.

For each sentence in training data 304, entity recognition engine 308 within abnormal entity detection mechanism 302 utilizes natural language processing to perform weak entity labeling so as to identify one or more entities associated with each intent identified for the sentence, the one or more entities defined specifically for business use cases by the customers, such as locations, organizations, times, or the like, to generate entity labeled workspace 310. For example, given a hypothetical chatbot that is designed for handling booking business trips, in the sentence "I want to book a flight from Los Angeles to Boston," an intent classifier would identify "to book a flight" as an intent and entity recognition engine 308 would identify "Los Angeles" and "Boston" as entities. FIG. 4 illustrates one exemplary embodiment of entity recognition engine 308 identifying an intent of each sentence and one or more entities within each sentence in the set of sentences within training data 304 in accordance with an illustrative embodiment. In FIG. 4, entity recognition engine 308 analyzes each sentence S in a set of sentences S1-Sn from training data 304 to identify one or more entities 404 associated with intent 402 of the sentence, which are identified by a "1" indicating an identification of an entity or a "0" indicating not entity identified, thereby forming entity labeled workspace 310. Ground truth intent labels 406 are intent labels provided by the client when they design the chatbot.

Figure 5:
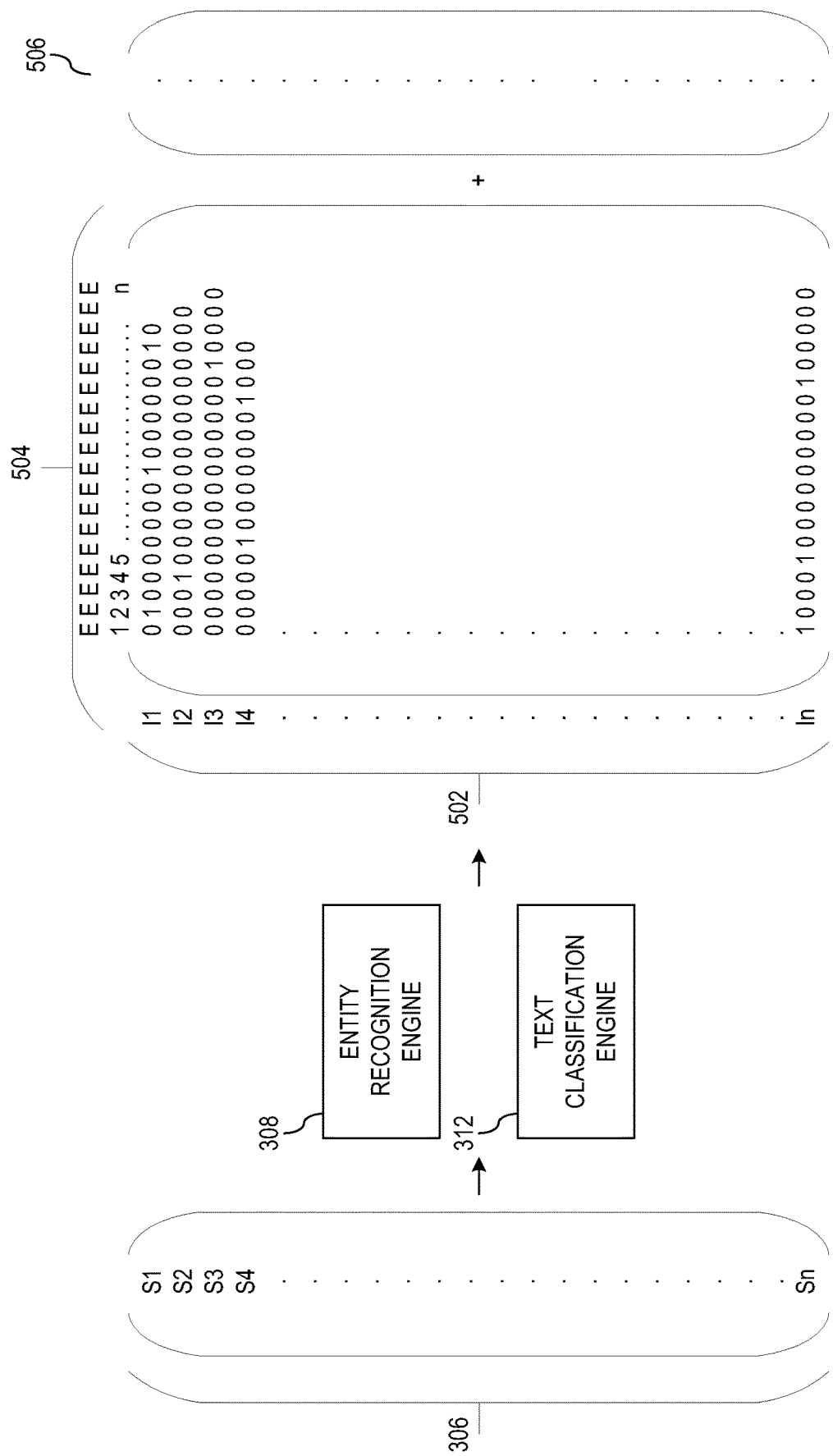
FIG. 5 illustrates one exemplary embodiment of an entity recognition engine and a text classification engine identifying an intent of each sentence and one or more entities within each sentence in the set of sentences within human conversation chat logs in accordance with an illustrative embodiment.

In another operation, for each sentence in human conversation chat logs 306, text classification engine 312 and entity recognition engine 308 and text classification engine 312 utilizes natural language processing, respectively, to perform weak intent labeling so as to identify an intent of the sentence as well as perform weak entity labeling so as to identify one or more entities, which are business use cases, such as locations, organizations, times, or the like, to generate entity/intent labeled chat logs 314. FIG. 5 illustrates one exemplary embodiment of text classification engine 312 and entity recognition engine 308 identifying an intent of each sentence and one or more entities within each sentence, respectively, in the set of sentences within human conversation chat logs 306 in accordance with an illustrative embodiment. In FIG. 5, text classification engine 312 and entity recognition engine 308 analyzes each sentence S in a set of sentences S1-Sn from human conversation chat logs 306 to identify both an intent 502 of the sentence and one or more entities 504 within the sentence, which are identified by a "1" or more indicating the frequency of identification of an entity or a "0" indicating not entity identified, thereby forming entity/intent labeled chat logs 314. Entity recognition engine 308 and text classification engine 312 may also receive a set of predicted intents 506 that are provided by the user which entity recognition engine 308 and text classification engine 312 add to entity/intent labeled chat logs 314. Predicted intents are contrary to true intents. That is, a true intent is an intent defined by the customer. However, for customer chat logs, true intents are not available. Thus, text classification engine 312 provides a predicted intent as to what the intent of a sentence should be.

Figure 6:
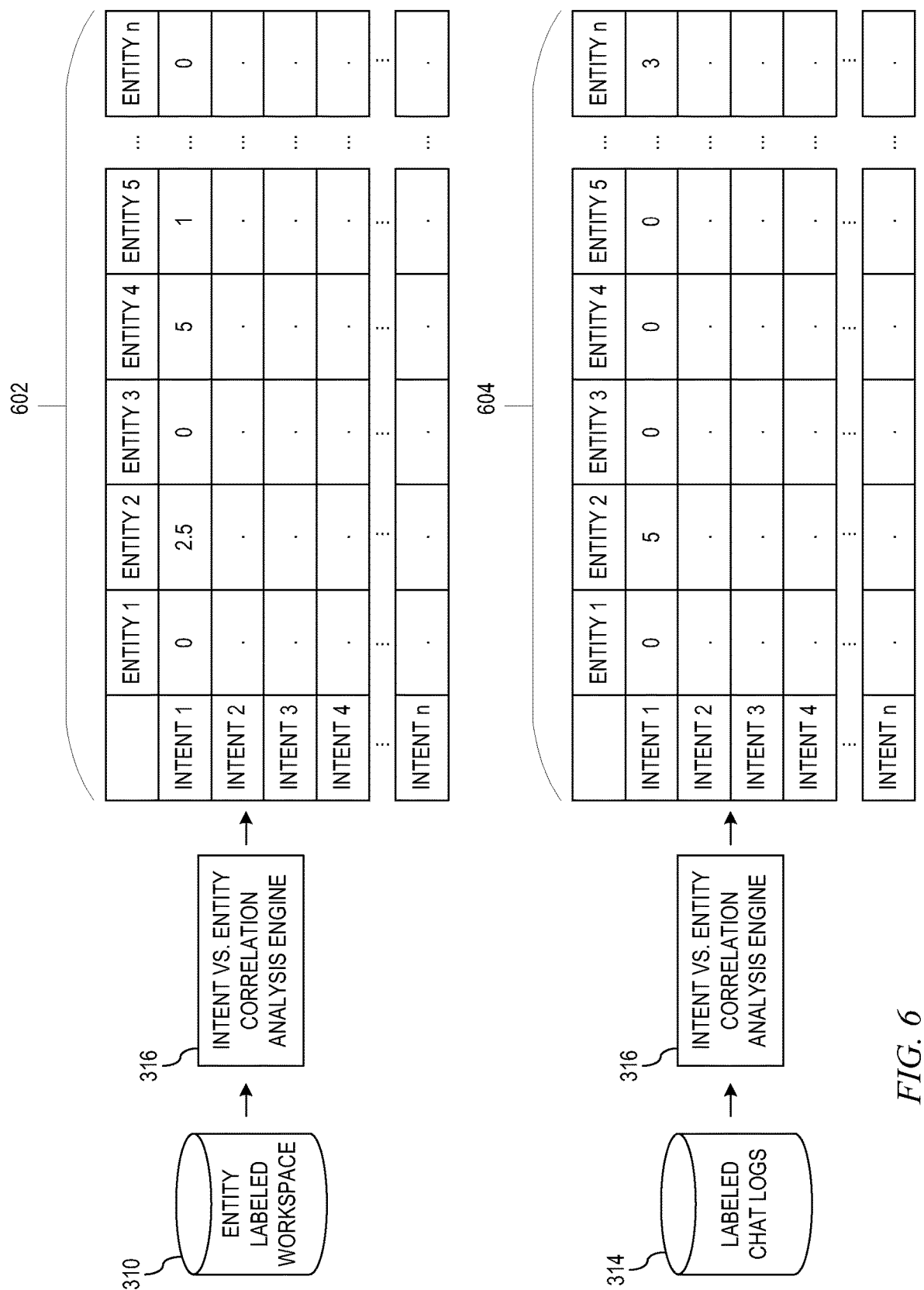
FIG. 6 illustrates one exemplary embodiment of an intent vs. entity correlation analysis engine generating a comparison of similar intents to entities identified within those intents from an entity labeled workspace and a comparison of similar intents to entities identified within those intents from a labeled chat logs in accordance with an illustrative embodiment.

With the entity labeled workspace 310 and entity/intent labeled chat logs 314 generated, intent vs. entity correlation analysis engine 316 performs a comparison of similar intents to entities identified within those intents for both the entity labeled workspace 310 and entity/intent labeled chat logs 314. That is, intent vs. entity correlation analysis engine 316 generates a mapping between entity to intent correlational score as illustrated in comparison 602 and comparison 604. For each row in comparison 602, intent vs. entity correlation analysis engine 316 provides entity scores for the intent of that row. The entity scores are correlational scores from a statistics perspective. The higher the entity score, the more correlated the entity is with the intent. Performing such an analysis, intent vs. entity correlation analysis engine 316 generates a table of intents, INTENT 1-INTENT n, versus entities, ENTITY 1-ENTITY N. FIG. 6 illustrates one exemplary embodiment of intent vs. entity correlation analysis engine 316 generating comparison 602 of similar intents to entities identified within those intents from entity labeled workspace 310 and comparison 604 of similar intents to entities identified within those intents from entity/intent labeled chat logs 314 in accordance with an illustrative embodiment.

Figure 7:
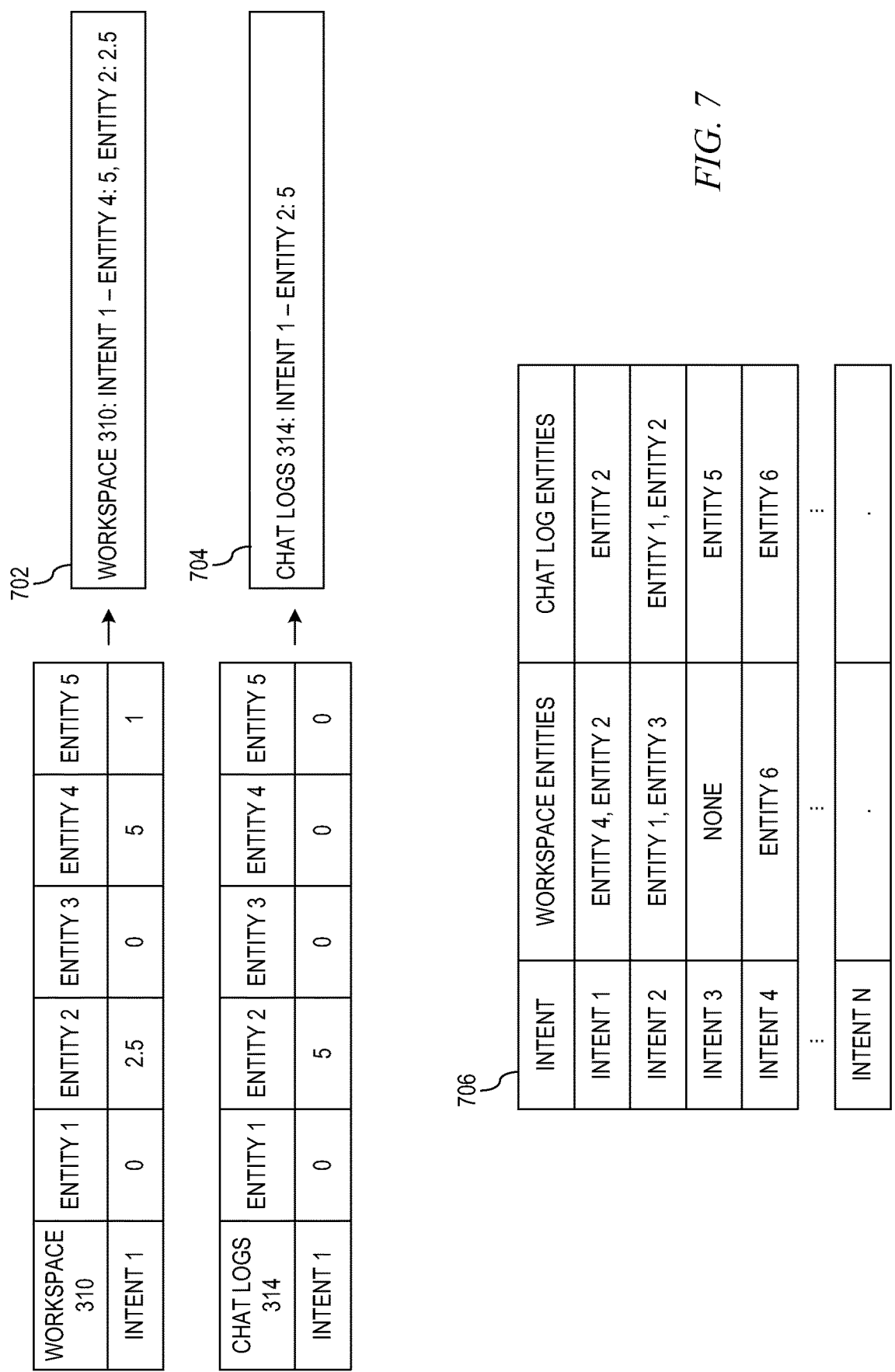
FIG. 7 illustrates one exemplary embodiment of identifying an intent_i from the comparison of an entity labeled workspace that matches intent_i from the comparison of a labeled chat logs and then filtering and ranking entities that are above a predefined significance level in accordance with an illustrative embodiment.

Utilizing the comparison 602 of similar intents to entities identified within those intents from entity labeled workspace 310 and the comparison 604 of similar intents to entities identified within those intents from entity/intent labeled chat logs 314, for each intent_i in the comparison of entity labeled workspace 310 that matches intent_i in the comparison of entity/intent labeled chat logs 314, intent vs. entity correlation analysis engine 316 identifies those entities that are above a predefined significance level. That is, intent vs. entity correlation analysis engine 316 filters out insignificant values using a predefined significant level, for example, values less than or equal to 1. Intent vs. entity correlation analysis engine 316 then ranks the remaining results. FIG. 7 illustrates one exemplary embodiment of identifying an intent_i from the comparison of entity labeled workspace 310 that matches intent_i from the comparison of entity/intent labeled chat logs 314 and then filtering and ranking entities that are above a predefined significance level in accordance with an illustrative embodiment. As is illustrated in FIG. 7, for INTENT 1 in the comparison of similar intents to entities identified within those intents from entity labeled workspace 310, intent vs. entity correlation analysis engine 316 produces results 702 from filtering out and ranking ENTITY 4 that has a value of 5 and ENTITY 2 that has a value of 2.5. As is also illustrated, for INTENT 1 in the comparison of similar intents to entities identified within those intents from entity/intent labeled chat logs 314, intent vs. entity correlation analysis engine 316 produces results 702 from filtering out and ranking ENTITY 2 that has a value of 5.

Intent vs. entity correlation analysis engine 316 continues this process for each intent_i in the comparison of entity labeled workspace 310 that has a matching intent_i in the comparison of entity/intent labeled chat logs 314, which is illustrated by results data structure 706. Utilizing the information in results data structure 706 as an example, abnormal entity detection engine 318 identifies, with regard to INTENT 1, ENTITY 4 may be mistakenly included in training data 304 as it fails to appear in any of human conversation chat logs 306 and requires further investigation. Thus, abnormal entity detection engine 318 provides an indication of a suspected mistake to an administrator for further investigation and/or deletes the entity from training data 304. As another example, with regard to INTENT 3, abnormal entity detection engine 318 identifies ENTITY 5 as a potential business case that should be added to training data 304 because ENTITY 5 appears in human conversation chat logs 306 but fails to appear in training data 304 and thus, requires further investigation. Thus, abnormal entity detection engine 318 provides an indication of a potential business case to an administrator for further investigation and/or adds the entity to training data 304.

Figure 8:
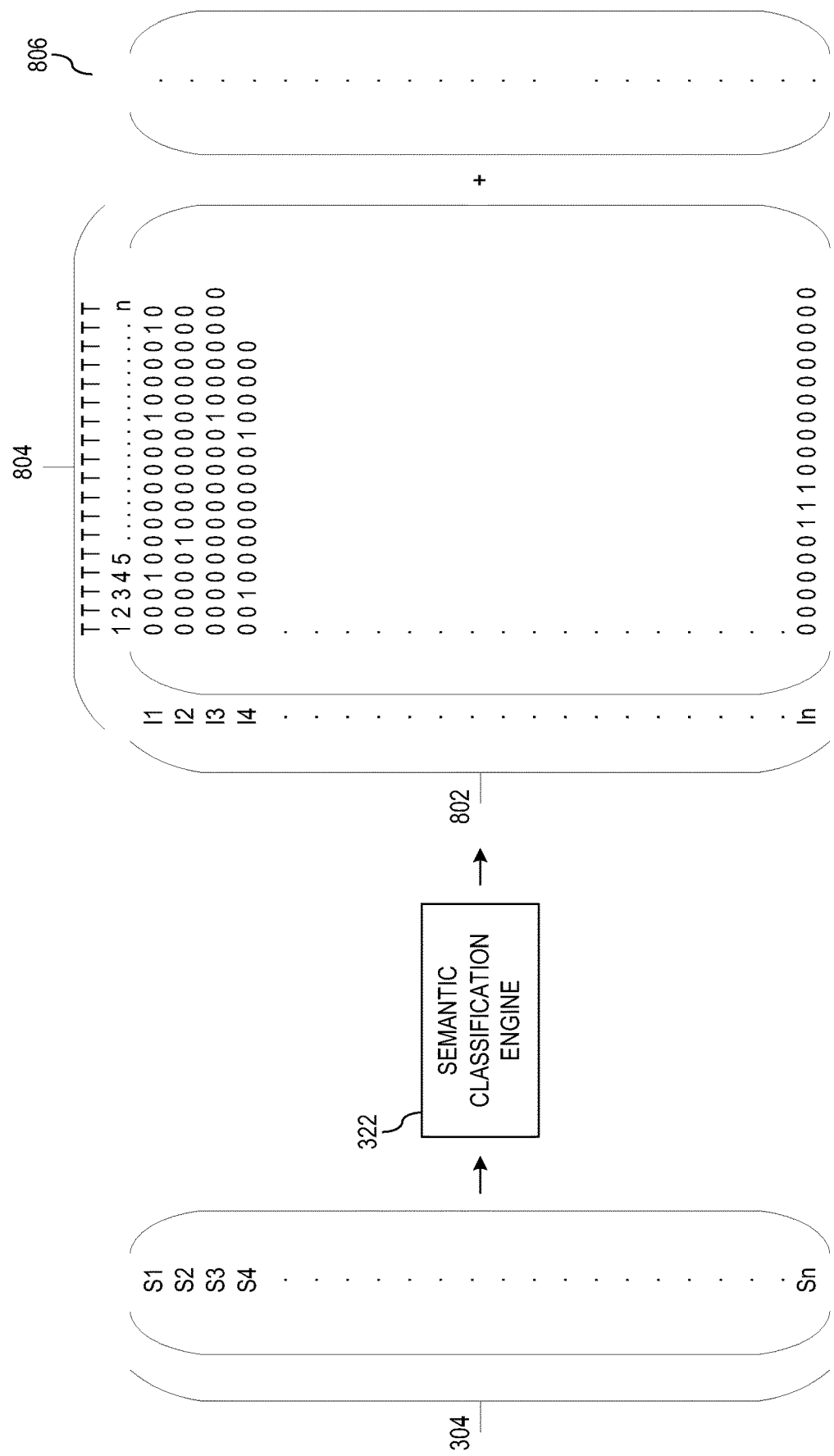
FIG. 8 illustrates one exemplary embodiment of a semantic classification engine identifying an intent of each sentence and one or more unigrams and bigrams within each sentence in the set of sentences within intent data in accordance with an illustrative embodiment.

In an additional embodiment, abnormal entity detection mechanism 302 may implement intent vs. term/phrase correlation analysis which performs a term-by-term (unigram) or phrase-by-phrase (bigram) analysis of how each term or phrase affects an intent, i.e. how correlated is that term or phrase is to identifying the intent of the sentence in training data 304. In order to implement intent vs. term/phrase correlation analysis, for each sentence in training data 304, semantic classification engine 320 within abnormal entity detection mechanism 302 utilizes natural language processing to identify one or more unigrams and bigrams associated with each intent identified for the sentence to generate semantic labeled workspace 322. For example, in the sentence "I want to book a flight from Los Angeles to Boston," semantic classification engine 320 would identify unigrams of "I," "want," "to," "book," "a," "flight," "from," "Los Angeles," "to," and "Boston." Semantic classification engine 320 may also identify bigrams of, for example, "I want," "want to," "to book," "book a," "a flight," "flight from," "from Los Angeles," "Los Angeles to," and "to Boston." FIG. 8 illustrates one exemplary embodiment of semantic classification engine 320 identifying an intent of each sentence and one or more unigrams and bigrams within each sentence in the set of sentences within training data 304 in accordance with an illustrative embodiment. In FIG. 8, semantic classification engine 320 analyzes each sentence S in a set of sentences S1-Sn from training data 304 to identify both an intent 802 of the sentence and those unigrams and/or bigrams 804 that affect the intent, thereby forming semantic labeled workspace 322. Semantic classification engine 320 may also receive a set of ground-truth labeled intents 806 that are provided by the user which semantic classification engine 320 adds to semantic labeled workspace 322.

Figures 9, 10:
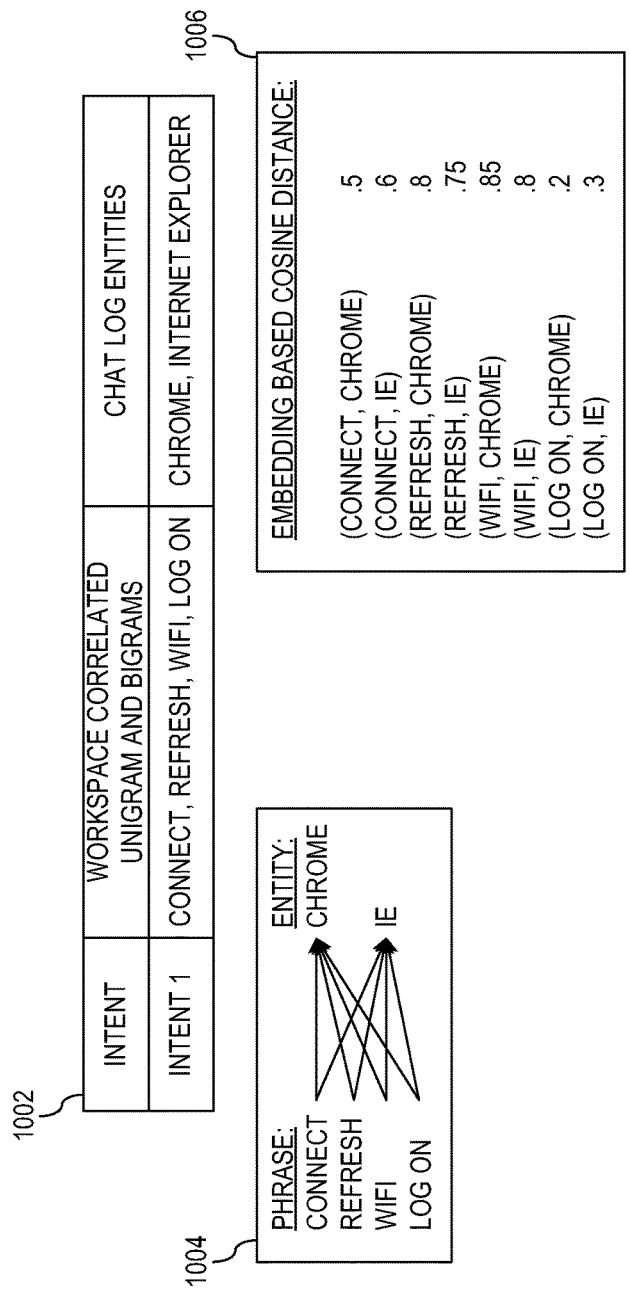
FIG. 9 illustrates one exemplary embodiment of identifying an intent_i from a semantic labeled workspace that matches intent_i from the comparison of labeled chat logs in accordance with an illustrative embodiment.
FIG. 10 illustrates one exemplary pairwise semantic correlation in accordance with an illustrative embodiment.

Next, intent vs. term correlation analysis engine 324 performs a comparison of intents identified in entity/intent labeled chat logs 314 to the intents identified in semantic labeled workspace 322. That is, for each intent_i in the comparison of semantic labeled workspace 322 that matches intent_i in the comparison of entity/intent labeled chat logs 314, intent vs. term correlation analysis engine 324 generates a data structure that compares one or more of the unigrams or bigrams associated with the intent as identified from semantic labeled workspace 322 to the entities associated with a same intent from entity/intent labeled chat logs 314. FIG. 9 illustrates one exemplary embodiment of identifying an intent_i from semantic labeled workspace 322 that matches intent_i from the comparison of entity/intent labeled chat logs 314 in accordance with an illustrative embodiment. As is illustrated in FIG. 9, for INTENT 1 in the comparison of similar intents in semantic labeled workspace 322 to those intents from labeled chat logs 314, intent vs. term correlation analysis engine 316 produces results 902 that illustrates for INTENT 1, UNIGRAM 3 and BIGRAM 1 correlate to ENTITY 2 from entity/intent labeled chat logs 314. Also, results 902 illustrate UNIGRAM 5 and UNIGRAM 12 correlate to ENTITY 1 and ENTITY 2 from entity/intent labeled chat logs 314.

In order to perform a pairwise semantic evaluation for a specific entity, semantic classification engine 320 generates a phrase embedding vector for each unigram and bigram identified in results 902 as well as a phrase embedding vector for each entity associated with the same intent. FIG. 10 illustrates one exemplary pairwise semantic correlation in accordance with an illustrative embodiment. In data structure 1002, for the intent "connection issue", there are 4 unigrams and bigrams of "connect," "refresh," "Wi-Fi," and "log on" that have been identified from semantic labeled workspace 322 as being associated with the intent "connection issue." Further, for the intent "connection issue", there are 2 entities of "Chrome" and "Internet Explorer" that have been identified from entity/intent labeled chat logs 314 as being associated with the intent "connection issue." Semantic classification engine 320 then creates pairs of workspace correlated unigrams and bigrams with chat log entities as is illustrated in data structure 1004. For each (unigram/bigram)/entity pair, semantic classification engine 320 determines a similarity score based on a cosine distance between each phrase embedding vector for each unigram/bigram and each phrase embedding vector for each first entity as is illustrated in data structure 1006. For any phrase more than 1 token, semantic classification engine 320 applies pooling to generate the phrase embedding. In data structure 1006, a similarity score of 1 is indicative of a perfect match and a similarity score of 0 is indicative of no similarity.

Utilizing the information in data structure 1006 as an example, abnormal entity detection engine 318 determines whether any (unigram/bigram)/entity pair has a similarity score greater than a predetermined similarity score threshold, for example, greater than 0.72. If so, the abnormal entity detection engine 318 flags the entity(ies) associated with that (unigram/bigram)/entity pair(s) as abnormal. In the example, illustrated in data structure 1006, if there is at least one (unigram/bigram)/entity pair for a particular entity that has a similarity score greater than the predetermined similarity score threshold then abnormal entity detection engine 318 considers that entity to be properly defined. However, if no (unigram/bigram)/entity pair for a particular entity has a similarity score greater than the similarity score value threshold, then abnormal entity detection engine 318 considers that entity needing to be redefined and as such, provides an indication to an administrator for further investigation of redefining the entity and/or redefine the entity in training data 304.

Thus, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 11:
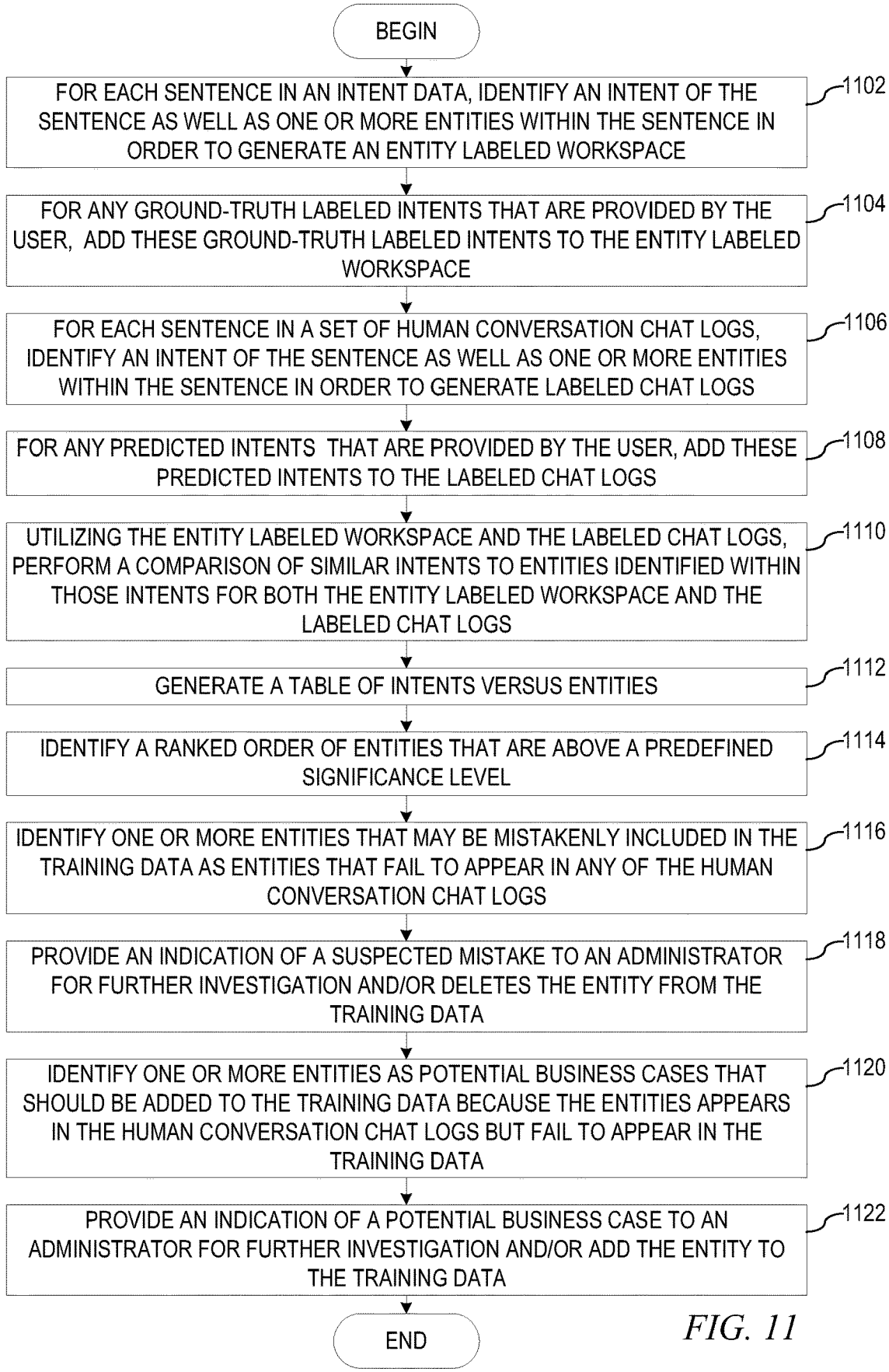
FIG. 11 depicts an exemplary flowchart of the operation performed by an abnormal entity detection mechanism in detecting abnormal entities in real-time response systems utilizing weak supervision in accordance with an illustrative embodiment.

FIG. 11 depicts an exemplary flowchart of the operation performed by an abnormal entity detection mechanism in detecting abnormal entities in real-time response systems utilizing weak supervision in accordance with an illustrative embodiment. As the operation begins, for each sentence in an intent data, an entity recognition engine within the abnormal entity detection mechanism utilizes natural language processing to identify an intent of the sentence as well as one or more entities within the sentence in order to generate an entity labeled workspace (step 1102). For any ground-truth labeled intents that are provided by the user, the entity recognition engine adds these ground-truth labeled intents to the entity labeled workspace (step 1104). Then, for each sentence in a set of human conversation chat logs, a text classification engine and the entity recognition engine utilizes natural language processing to identify an intent of the sentence as well as one or more entities within the sentence, respectively, in order to generate a set of labeled chat logs (step 1106). For any predicted intents that are provided by the user, the entity recognition engine and the text classification engine add these predicted intents to the set of labeled chat logs (1108). Predicted intents are contrary to true intents. That is, a true intent is an intent defined by the customer. However, for customer chat logs, true intents are not available. Thus, the text classification engine provides a predicted intent as to what the intent of a sentence should be.

Utilizing the entity labeled workspace and the labeled chat logs, an intent vs. entity correlation analysis engine within the abnormal entity detection mechanism performs a comparison of similar intents to entities identified within those intents for both the entity labeled workspace and the labeled chat logs (step 1110). That is, the intent vs. entity correlation analysis engine generates a mapping between entity to intent correlational score. For each row, the intent vs. entity correlation analysis engine provides entity scores for the intent of that row. The entity scores are correlational scores from a statistics perspective. The higher the entity score, the more correlated the entity is with the intent . . . . Performing such an analysis, the intent vs. entity correlation analysis engine generates a table of intents versus entities (step 1112).

Utilizing the comparison of similar intents to entities identified within those intents from the entity labeled workspace and the comparison of similar intents to entities identified within those intents from the labeled chat logs, for each intent_i in the comparison of the entity labeled workspace that matches intent_i in the comparison of the labeled chat logs, the intent vs. entity correlation analysis engine identifies a ranked order of entities that are above a predefined significance level (step 1114). That is, the intent vs. entity correlation analysis engine filters out insignificant values using a predefined significant level, for example, values less than or equal to 1. Then, the intent vs. entity correlation analysis engine ranks the remaining results. Utilizing the ranked order of entities that are above a predefined significance level, an abnormal entity detection engine within the abnormal entity detection mechanism identifies one or more entities that may be mistakenly included in the training data as entities that fail to appear in any of the human conversation chat logs (step 1116). If identified, the abnormal entity detection engine provides an indication of a suspected mistake to an administrator for further investigation and/or deletes the entity from the training data (step 1118). Further, the abnormal entity detection engine identifies one or more entities as potential business cases that should be added to the training data because the entities appears in the human conversation chat logs but fail to appear in the training data (step 1120). If identified, the abnormal entity detection engine provides an indication of a potential business case to an administrator for further investigation and/or adds the entity to the training data (step 1122), with the operation ending thereafter.

Figure 12:
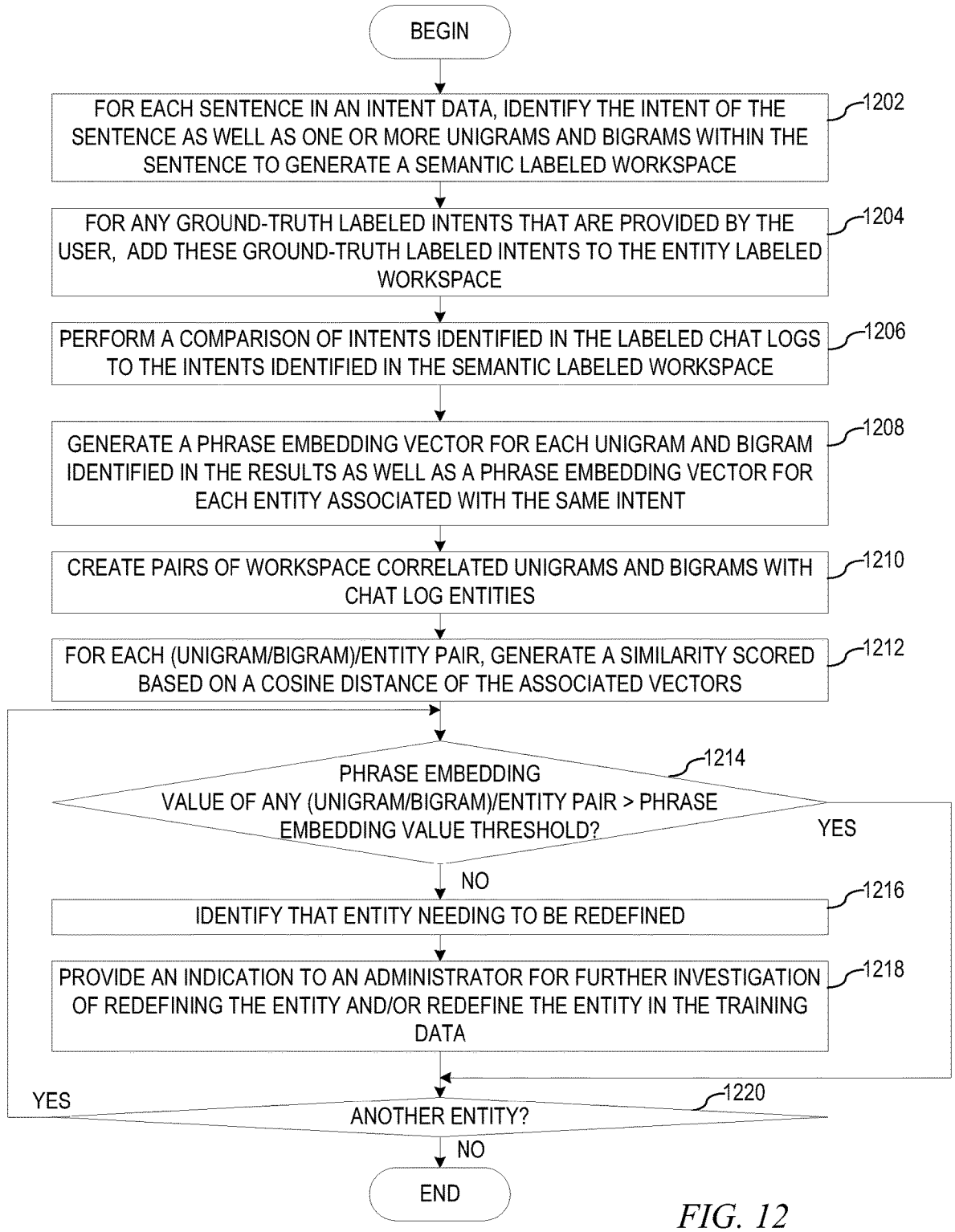
FIG. 12 depicts a further exemplary flowchart of the operation performed by an abnormal entity detection mechanism utilizing intent vs. term/phrase correlation analysis to detect abnormal entities in real-time response systems in accordance with an illustrative embodiment.

FIG. 12 depicts a further exemplary flowchart of the operation performed by an abnormal entity detection mechanism utilizing intent vs. term/phrase correlation analysis to detect abnormal entities in real-time response systems in accordance with an illustrative embodiment. As the operation begins, for each sentence in a set of intent data, a semantic classification engine within the abnormal entity detection mechanism utilizes natural language processing to identify the intent of the sentence as well as one or more unigrams and bigrams within the sentence to generate a semantic labeled workspace (step 1202). That is, the semantic classification engine analyzes each sentence S in a set of sentences S1-Sn from the intent data to identify both an intent of the sentence and those unigrams and/or bigrams that affect the intent, thereby forming the semantic labeled workspace. For any ground-truth labeled intents that are provided by the user, the semantic classification engine adds the ground-truth labeled intents to the semantic labeled workspace (step 1204). An intent vs. term correlation analysis engine within the abnormal entity detection mechanism then performs a comparison of intents identified in the labeled chat logs to the intents identified in the semantic labeled workspace (step 1206). That is, for each intent_i in the comparison of the semantic labeled workspace that matches intent_i in the comparison of the labeled chat logs, the intent vs. term correlation analysis engine generates a data structure that compares one or more of the unigrams or bigrams associated with the intent as identified from the semantic labeled workspace to the entities associated with a same intent from the labeled chat logs.

In order to perform a pairwise semantic evaluation for a specific entity, the semantic classification engine generates a phrase embedding vector for each unigram and bigram identified in the results as well as a phrase embedding vector for each entity associated with the same intent (step 1208). The semantic classification engine then creates pairs of workspace correlated unigrams and bigrams with chat log entities (step 1210). For each (unigram/bigram)/entity pair, the semantic classification engine determines a similarity score based on a cosine distance between each phrase embedding vector for each unigram/bigram and each phrase embedding vector for each first entity (step 1212). For any phrase more than 1 token, the semantic classification engine applies pooling to generate the phrase embedding. Utilizing the generated information, the abnormal entity detection engine determines whether any (unigram/bigram)/entity pair has a similarity score greater than a predetermined similarity score threshold (step 1214).

If at step 1214 there is at least one (unigram/bigram)/entity pair for a particular entity that has a similarity score greater than the predetermined similarity score threshold, then the abnormal entity detection engine considers that entity to be properly defined and the operation proceeds to step 1220. However, if at step 1214 the abnormal entity detection engine determines that no (unigram/bigram)/entity pair for a particular entity has a similarity score greater than the predetermined similarity score threshold, then the abnormal entity detection engine determines that entity needing to be redefined (step 1216) and, as such, provides an indication to an administrator for further investigation of redefining the entity and/or redefines the entity in the training data (step 1218). At step 1220, the abnormal entity detection engine determines whether another entity needs to be analyzed. If at step 1220 another entity needs to be analyzed, the operation returns to step 1214. If at step 1220 no other entity needs to be analyzed, the operation terminates.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for tracking an interaction between intents and entities within a real-time response system. The abnormal entity detection mechanism maps a set of entities to a set of intents in training data using correlation analysis to generate an entity labeled workspace. The abnormal entity detection mechanism then maps a set of entities to a set of intents in a set of human conversation chat logs to generate a set of labeled chat logs. The abnormal entity detection mechanism then compares a distributional difference between entities and intents in training data, i.e. the entities in the entity labeled workspace, to a distributional difference between entities and intents in the set of labeled chat logs to identify entities that are potential business-use cases that should be added to the v for use in conversations with humans. As an additional feature, the abnormal entity detection mechanism may map a set of terms that are semantically similar to the identified entities in the entity labeled workspace to generate a semantic entity labeled workspace. The abnormal entity detection mechanism then compares a distributional difference between entities and intents in training data, i.e. the entities in the entity labeled workspace, to a distributional difference between entities and intents in the set of labeled chat logs to identify additional entities that are potential business-use cases that should be added to the real-time response system for use in conversations with humans and/or identify entities that may need to be redefined. In either comparison, the abnormal entity detection mechanism may remove outliers of intent/entity pairing by filtering out insignificant comparison values that are below a predetermined level.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for comprising at least one processor and at least one memory, wherein the at least one memory comprises instructions that are executed by the at least one processor to configure the at least one processor to implement an abnormal entity detection mechanism that facilitates detecting abnormal entities in real-time response systems through weak supervision, the method comprising:

for each first intent of one or more first intents from an entity labeled workspace, identifying one or more first entities associated with the first intent and an entity score associated with each first entity;

for each second intent of one or more second intents from labeled chat logs, identifying one or more second entities associated with the second intent and an entity score associated with each second entity;

for each first intent from the entity labeled workspace that matches a second intent in the labeled chat logs, recording the first entity or the second entity in a results data structure when the entity score associated with each first entity or second entity is above a predefined significance level; and for each first intent from the entity labeled workspace that matches the second intent in the labeled chat logs:

responsive to the first entity being recorded in a results data structure and the second entity failing to be recorded in the results data structure, removing that the first entity from the training data as being mistakenly included in the training data; or responsive to the second entity being recorded in the results data structure and the first entity failing to be recorded in the results data structure, adding the second entity as a potential business case to the training data.

2. The method of claim 1, wherein the one or more first entities associated with the first intent in the entity labeled workspace are identified from intent data utilizing weak entity labeling through natural language processing.

3. The method of claim 1, wherein each second intent is identified from human conversation chat logs utilizing weak intent labeling through natural language processing and wherein the one or more second entities associated with each second intent are identified from human conversation chat logs utilizing weak entity labeling through natural language processing.

4. The method of claim 1, wherein the entity score associated with each first entity associated with each first intent is generated through correlation analysis of an intent of a sentence identified by a customer to entities identified from the sentence associated with the identified intent.

5. The method of claim 1, wherein the entity score associated with each second entity associated with each second intent is generated through correlation analysis of a predicted intent of a sentence identified to entities identified from the sentence associated with the predicted intent.

6. The method of claim 1, further comprising:

performing a pairwise semantic evaluation by creating one or more (unigram/bigram)/entity pairs of each of one or more unigrams and bigrams to each first entity in the one or more first entities associated with the first intent;

generating a first set of phrase embedding vectors for each unigram/bigram and a second set of phrase embedding vectors for each first entity;

determining a similarity score based on a cosine distance between each phrase embedding vector for each unigram/bigram and each phrase embedding vector for each first entity; and responsive to none of the one or more (unigram/bigram)/entity pairs having similarity score greater than a predetermined similarity score, redefining the first entity in the training data.

7. The method of claim 6, wherein the one or more unigrams and bigrams are identified by:

for each sentence on intent data, performing natural language processing on the sentence to identify the one or more unigrams or bigrams of the sentence as being associated with the intent identified for the sentence thereby forming a semantic labeled workspace;

performing a comparison of intents identified in labeled chat logs to the intents identified in the semantic labeled workspace; and recording those one or more unigrams and bigrams associated with the intents in the labeled chat logs that match intents in the semantic labeled workspace.

8. A computer program product comprising a computer readable storage medium having a computer readable program stored therein, wherein the computer readable program, when executed on a data processing system, causes the data processing system to implement an abnormal entity detection mechanism that facilitates detecting abnormal entities in real-time response systems through weak supervision, and further causes the data processing system to:

for each first intent of one or more first intents from an entity labeled workspace, identify one or more first entities associated with the first intent and an entity score associated with each first entity;

for each second intent of one or more second intents from labeled chat logs, identify one or more second entities associated with the second intent and an entity score associated with each second entity;

for each first intent from the entity labeled workspace that matches a second intent in the labeled chat logs, record the first entity or the second entity in a results data structure when the entity score associated with each first entity or second entity is above a predefined significance level; and for each first intent from the entity labeled workspace that matches the second intent in the labeled chat logs:
- responsive to the first entity being recorded in a results data structure and the second entity failing to be recorded in the results data structure, remove that the first entity from the training data as being mistakenly included in the training data; or
- responsive to the second entity being recorded in the results data structure and the first entity failing to be recorded in the results data structure, add the second entity as a potential business case to the training data.

9. The computer program product of claim 8, wherein the one or more first entities associated with the first intent in the entity labeled workspace are identified from intent data utilizing weak entity labeling through natural language processing.

10. The computer program product of claim 8, wherein each second intent is identified from human conversation chat logs utilizing weak intent labeling through natural language processing and wherein the one or more second entities associated with each second intent are identified from human conversation chat logs utilizing weak entity labeling through natural language processing.

11. The computer program product of claim 8, wherein the entity score associated with each first entity associated with each first intent is generated through correlation analysis of an intent of a sentence identified by a customer to entities identified from the sentence associated with the identified intent.

12. The computer program product of claim 8, wherein the entity score associated with each second entity associated with each second intent is generated through correlation analysis of a predicted intent of a sentence identified to entities identified from the sentence associated with the predicted intent.

13. The computer program product of claim 8, wherein the computer readable program further causes the data processing system to:
- perform a pairwise semantic evaluation by creating one or more (unigram/bigram)/entity pairs of each of one or more unigrams and bigrams to each first entity in the one or more first entities associated with the first intent;
- generating a first set of phrase embedding vectors for each unigram/bigram and a second set of phrase embedding vectors for each first entity;
- determining a similarity score based on a cosine distance between each phrase embedding vector for each unigram/bigram and each phrase embedding vector for each first entity; and
- responsive to none of the one or more (unigram/bigram)/entity pairs having similarity score greater than a predetermined similarity score, redefining the first entity in the training data.

14. The computer program product of claim 13, wherein the one or more unigrams and bigrams are identified by the computer readable program further causing the data processing system to:
- for each sentence on intent data, perform natural language processing on the sentence to identify the one or more unigrams or bigrams of the sentence as being associated with the intent identified for the sentence thereby forming a semantic labeled workspace;
- perform a comparison of intents identified in labeled chat logs to the intents identified in the semantic labeled workspace; and
- record those one or more unigrams and bigrams associated with the intents in the labeled chat logs that match intents in the semantic labeled workspace.

15. An apparatus comprising:
at least one processor; and
at least one memory coupled to the at least one processor, wherein the at least one memory comprises instructions which, when executed by the at least one processor, cause the at least one processor to implement an abnormal entity detection mechanism that facilitates detecting abnormal entities in real-time response systems through weak supervision, and further cause the at least one processor to:

for each first intent of one or more first intents from an entity labeled workspace, identify one or more first entities associated with the first intent and an entity score associated with each first entity;

for each second intent of one or more second intents from labeled chat logs, identify one or more second entities associated with the second intent and an entity score associated with each second entity;

for each first intent from the entity labeled workspace that matches a second intent in the labeled chat logs, record the first entity or the second entity in a results data structure when the entity score associated with each first entity or second entity is above a predefined significance level; and for each first intent from the entity labeled workspace that matches the second intent in the labeled chat logs:
- responsive to the first entity being recorded in a results data structure and the second entity failing to be recorded in the results data structure, remove that the first entity from the training data as being mistakenly included in the training data; or
- responsive to the second entity being recorded in the results data structure and the first entity failing to be recorded in the results data structure, add the second entity as a potential business case to the training data.

16. The apparatus of claim 15, wherein the one or more first entities associated with the first intent in the entity labeled workspace are identified from intent data utilizing weak entity labeling through natural language processing.

17. The apparatus of claim 15, wherein each second intent is identified from human conversation chat logs utilizing weak intent labeling through natural language processing and wherein the one or more second entities associated with each second intent are identified from human conversation chat logs utilizing weak entity labeling through natural language processing.

18. The apparatus of claim 15, wherein the entity score associated with each first entity associated with each first intent is generated through correlation analysis of an intent of a sentence identified by a customer to entities identified from the sentence associated with the identified intent.

19. The apparatus of claim 15, wherein the entity score associated with each second entity associated with each second intent is generated through correlation analysis of a predicted intent of a sentence identified to entities identified from the sentence associated with the predicted intent.

20. The apparatus of claim 15, wherein the instructions further causes the at least one processor to:

perform a pairwise semantic evaluation by creating one or more (unigram/bigram)/entity pairs of each of one or more unigrams and bigrams to each first entity in the one or more second entities associated with the first intent;

generating a first set of phrase embedding vectors for each unigram/bigram and a second set of phrase embedding vectors for each first entity;

determining a similarity score based on a cosine distance between each phrase embedding vector for each unigram/bigram and each phrase embedding vector for each first entity; and responsive to none of the one or more (unigram/bigram)/entity pairs having similarity score greater than a predetermined similarity score, redefining the first entity in the training data.

\* \* \* \* \*